United States Patent
Park et al.

(10) Patent No.: US 11,183,177 B2
(45) Date of Patent: Nov. 23, 2021

(54) REAL-TIME VOICE RECOGNITION APPARATUS EQUIPPED WITH ASIC CHIP AND SMARTPHONE

(71) Applicant: POSTECH ACADEMY-INDUSTRY FOUNDATION, Pohang-si (KR)

(72) Inventors: Hong June Park, Pohang-si (KR); Hyeon Kyu Noh, Incheon (KR); Won Cheol Lee, Mokpo-si (KR); Kyeong Won Jeong, Busan (KR)

(73) Assignee: Postech Academy-Industry Foundation, Pohang-si (KR)

( * ) Notice: Subject to any disclaimer, the term of this patent is extended or adjusted under 35 U.S.C. 154(b) by 187 days.

(21) Appl. No.: 16/626,862

(22) PCT Filed: Apr. 26, 2018

(86) PCT No.: PCT/KR2018/004853
§ 371 (c)(1),
(2) Date: Dec. 26, 2019

(87) PCT Pub. No.: WO2019/004582
PCT Pub. Date: Jan. 3, 2019

(65) Prior Publication Data
US 2020/0135178 A1    Apr. 30, 2020

(30) Foreign Application Priority Data

Jun. 28, 2017  (KR) .......................... 10-2017-0081608

(51) Int. Cl.
*G10L 15/187*    (2013.01)
*G06F 21/76*    (2013.01)
(Continued)

(52) U.S. Cl.
CPC ............ *G10L 15/187* (2013.01); *G06F 21/76* (2013.01); *G06N 3/08* (2013.01); *G10L 13/00* (2013.01);
(Continued)

(58) Field of Classification Search
CPC .............. G10L 13/00; G10L 2015/025; G10L 2015/223; G06F 21/76; G06F 3/167;
(Continued)

(56) References Cited

U.S. PATENT DOCUMENTS 8,463,610 B1 *  6/2013  Bourke ................. G10L 15/197
                                                      704/257
2006/0235686 A1 * 10/2006  Jeong ...................... G10L 15/32
                                                      704/238
(Continued)

FOREIGN PATENT DOCUMENTS

JP    2016-212273 A    12/2016
KR    2001-0008073    2/2001
(Continued)

OTHER PUBLICATIONS

Yazdani et al. "Low-Power Automatic Speech Recognition Through a Mobile GPU and Viterbi Accelerator". IEEE Micro, vol. 37, Issue: 1, Jan.-Feb. 2017, pp. 22-29 (Year: 2017).*
(Continued)

*Primary Examiner* — Jesse S Pullias
(74) *Attorney, Agent, or Firm* — Morgan, Lewis & Bockius LLP

(57) ABSTRACT

The present invention relates to a real-time voice recognition apparatus equipped with an application-specific integrated circuits (ASIC) chip and a smartphone, capable, by using one smartphone and one ASIC chip and without using a cloud computer, of assuring personal privacy, and, due to a short delay time, enabling real-time conversion of voice
(Continued)

input signals into text for output. When one DRAM chip is optionally added to the real-time voice recognition apparatus, the number of neural network layers is increased thereby significantly improving accuracy of conversion of voice input signals into text.

20 Claims, 13 Drawing Sheets

(51) Int. Cl.
*G06N 3/08* (2006.01)
*G10L 15/02* (2006.01)
*G10L 15/16* (2006.01)
*G10L 15/22* (2006.01)
*G10L 13/00* (2006.01)

(52) U.S. Cl.
CPC .............. *G10L 15/02* (2013.01); *G10L 15/16* (2013.01); *G10L 15/22* (2013.01); *G10L 2015/025* (2013.01); *G10L 2015/223* (2013.01)

(58) Field of Classification Search
CPC ........ G06F 21/32; G06N 3/08; G06N 3/0481; G06N 3/0445
USPC .................................. 704/231–257, 270–275
See application file for complete search history.

(56) References Cited

U.S. PATENT DOCUMENTS

| | | | |
|---|---|---|---|
| 2011/0137648 A1* | 6/2011 | Ljolje | G10L 15/285 704/231 |
| 2017/0323638 A1* | 11/2017 | Malinowski | G10L 15/22 |
| 2019/0147856 A1* | 5/2019 | Price | G06N 3/063 704/232 |

FOREIGN PATENT DOCUMENTS

| | | |
|---|---|---|
| KR | 10-2004-0083921 | 10/2004 |
| KR | 10-0861653 B1 | 10/2008 |
| KR | 10-2009-0035944 A | 4/2009 |
| KR | 10-2014-0001711 A | 1/2014 |
| KR | 10-2014-0112360 A | 9/2014 |
| WO | WO 2016-137042 A1 | 9/2016 |

OTHER PUBLICATIONS

Choi et al., "A Real-Time FPGA-Based 20 000-Word Speech Recognizer With Optimized DRAM Access," IEEE Transactions on Circuits and Systems—I: Regular Papers, vol. 57, No. 8, Aug. 2010.
International Search Report for Application No. PCT/KR2018/004853 dated Aug. 21, 2018, 2 pages.
Written Opinion for Application No. PCT/KR2018/004853 dated Aug. 21, 2018, 9 pages.

* cited by examiner

| i | f i[Hz] | mi | i | f i[Hz] | mi | i | f i[Hz] | mi |
|---|---|---|---|---|---|---|---|---|
| 1 | 150.0 | 218.8 | 15 | 1103.9 | 1066.9 | 29 | 3128.5 | 1914.9 |
| 2 | 196.9 | 279.4 | 16 | 1203.6 | 1127.4 | 30 | 3339.9 | 1975.5 |
| 3 | 246.5 | 340.0 | 17 | 1308.7 | 1188.0 | 31 | 3563.0 | 2036.1 |
| 4 | 298.7 | 400.5 | 18 | 1419.6 | 1248.6 | 32 | 3798.4 | 2096.7 |
| 5 | 353.9 | 461.1 | 19 | 1536.6 | 1309.2 | 33 | 4046.8 | 2157.2 |
| 6 | 412.1 | 521.7 | 20 | 1660.2 | 1369.8 | 34 | 4308.9 | 2217.8 |
| 7 | 473.5 | 582.3 | 21 | 1790.5 | 1430.3 | 35 | 4585.5 | 2278.4 |
| 8 | 538.3 | 642.8 | 22 | 1928.0 | 1490.9 | 36 | 4877.4 | 2339.0 |
| 9 | 606.7 | 703.4 | 23 | 2073.1 | 1551.5 | 37 | 5185.4 | 2399.5 |
| 10 | 678.8 | 764.0 | 24 | 2226.3 | 1612.1 | 38 | 5510.4 | 2460.1 |
| 11 | 755.0 | 824.6 | 25 | 2387.8 | 1672.6 | 39 | 5853.3 | 2520.7 |
| 12 | 835.3 | 885.1 | 26 | 2558.4 | 1733.2 | 40 | 6215.2 | 2581.3 |
| 13 | 920.1 | 945.7 | 27 | 2738.3 | 1793.8 | 41 | 6597.1 | 2641.8 |
| 14 | 1009.5 | 1006.3 | 28 | 2928.2 | 1854.4 | 42 | 7000.0 | 2702.4 |

```
main()
{
    RNN_parameter[ ] = Read_acoustic_lexical_model_from_flash_memory();
    WFST_dictionary[ ] = Read_language_model_from_flash_memory ();
    send_to_RNN_asic_through_usb(RNN_parameter);
    while(speak) {
        audio_frame_data = read_audio_frame_buffer_from_audio_driver();
        //Speech data from mic of smartphone
        send_to_RNN_asic_through_usb(audio_buffer);
        word_probability= receive_from_RNN_asic_through_usb();
        //Get probability of words from RNN asic chips For(k=0;k=length(Word_probability);k++)
            Prob_Words[k]=EnqueueGPUBuffer(WFSTLanguageProcess,
            word_probability,WFST_dictionary);
        //Get Probability of words from GPU WFSTprogram
        For(k=0; k< length(Prob_Words);k++) Words[k]=max(Prob_Words[k]); Display(Words);
    }
}

// code running in GPU
Kernel WFSTLanguageProcess(phoneme_sequence, WFST_dictionary, [row, column] Prob_Words)
{
    Word_selected = WFST_dictionary[column];
    Prob_Words [row] = max(Prob_Words[row], Prob_Words[row-1]
                    * Probability(Word_selected) * Transition_probability(Word_selected);
}
```

// code running in CPU

REAL-TIME VOICE RECOGNITION APPARATUS EQUIPPED WITH ASIC CHIP AND SMARTPHONE

TECHNICAL FIELD

The disclosure relates to a real-time voice recognition apparatus, and more particularly, to a real-time voice recognition apparatus including an application-specific integrated circuit (ASIC) chip and a smartphone, which can guarantee personal privacy, have a short delay time, and convert and output a voice input signal as text in real time using one smartphone and one ASIC chip without using a cloud computer.

BACKGROUND ART

With the supply of a graphics processing unit (hereinafter referred to as a "GPU") and the emergence of Alexnet in 2012, the accuracy of machine learning was significantly improved. Accordingly, machine learning started to be actively applied to wide application fields including image recognition, voice recognition and medical diagnosis.

Today, most of voice recognition apparatuses, such as Baidu, transmit an audio speech, received from the terminal of a user, to a cloud computer, recognize a voice through large-scale parallel processing using a GPU connected to the cloud computer, and retransmit corresponding results to the terminal of the user.

Currently, the accuracy of a voice recognition apparatus using a cloud computer has reached about 95%. Accordingly, an American telephone company has enabled a hearing-impaired user to easily make a telephone call in such a manner that a screen of a flat panel display, such as a liquid crystal display (LCD), is attached to the telephone of the user and a telephone company transmits an audio speech and a text signal to the telephone of the user at the same time so that the text signal is displayed on the flat panel display attached to the telephone of the user and the audio speech is simultaneously transmitted to a receiver located near an ear of the user.

A voice recognition technology using a cloud computer which is now chiefly used has a slow response time due to the time necessary for Internet communication between the cloud computer and a user and may cause a personal privacy problem because the audio speeches of all users are transmitted to the cloud computer.

In order to solve the problems of a response time and personal privacy, active researches for increasing the operating speed of voice recognition and reducing power consumption are recently carried out by implementing a deep neural network (hereinafter referred to as a "DNN"), a convolutional neural network (hereinafter referred to as a "CNN") or a recurrent neural network (hereinafter referred to as an "RNN"), that is, a software machine learning algorithm, in the form of a field programmable gate array (hereinafter referred to as an "FPGA") or an ASIC chip, that is, hardware (IS SCC 2017, etc.).

It has been known that it is effective to simultaneously use an RNN algorithm and a long short-term memory (hereinafter referred to as a "LSTM") algorithm for an audio speech recognition due to the property of the audio speech continued for a relatively long time. For voice recognition, research of implementing the LSTM-RNN using an FPGA has been published. A high-capacity memory chip of several hundreds of Mbits or more located outside an FPGA chip is necessary to store a word dictionary and sentence dictionary required for lexical/language model processing. Research of implementing an LSTM-RNN for voice recognition using an ASIC chip has not yet been published because it is difficult to implement such a high-capacity memory in one ASIC chip along with a logic circuit.

The entire voice recognition operation may be performed in a software way using a central processing unit (hereinafter referred to as "CPU") and GPU embedded in an application processor (hereinafter referred to as an "AP") chip of a smartphone. However, even in such a case, there is a difficulty in performing a real-time operation.

In the case of CMU Sphinx, that is, a common voice recognition program, time of about 60% is used for acoustic model processing and time of about 40% is used for lexical/language model processing.

That is, in the existing voice recognition apparatus, voice information input to a terminal, such as a smartphone, is transmitted to a cloud computer through wireless or wired Internet communication. The cloud computer converts the voice information into word text and retransmits the converted word text to the terminal through Internet communication. In such an existing voice recognition method, the processing speed of a cloud computer is very fast, but a real-time operation is often difficult to perform because a delay time increases due to time taken for two Internet communications between a terminal and the cloud computer.

Furthermore, there may be a personal privacy problem with the conversation contents of a user because all pieces of voice information of the user are concentrated on a cloud computer.

DISCLOSURE

Technical Problem

Various embodiments are directed to the provision of a real-time voice recognition apparatus including an application-specific integrated circuit (ASIC) chip and a smartphone, which can have a short delay time and no privacy problem, and perform real-time processing by converting and outputting a voice input signal as text in real time using one smartphone and one ASIC chip without using a cloud computer.

Technical Solution

In a first embodiment of the disclosure, a real-time voice recognition apparatus including an ASIC chip and a smartphone includes an ASIC chip configured to receive a first digital audio speech as an input, output a feature vector, and output a phoneme score from the feature vector; and a smartphone connected to the ASIC chip through a data port and configured to receive the phoneme score from the ASIC chip as an input, output word text, and process and output the word text according to user needs.

In a second embodiment of the disclosure, a real-time voice recognition apparatus including an ASIC chip and a smartphone includes a DRAM chip configured to output first parameter data (Dp1) and receive second parameter data (Dp2) as an input; an ASIC chip configured to receive a first digital audio speech and the first parameter data (Dp1) as an input and output a phoneme score (PS) and the second parameter data (Dp2); and a smartphone connected to the ASIC chip through a data port and configured to receive the phoneme score as an input from the ASIC chip, output word text, and process and output the word text according to user needs.

Advantageous Effects

In accordance with the real-time voice recognition apparatus including an ASIC chip and a smartphone according to an embodiment of the disclosure, there are effects in that a voice input signal can be converted into text and output in real time because privacy is guaranteed and a delay time is short, by using one smartphone and one ASIC chip without using a cloud computer.

BRIEF DESCRIPTION OF DRAWINGS

FIG. 2 is a diagram illustrating boundary frequency values of frequency bands used in the real-time voice recognition apparatus including an ASIC chip and a smartphone according to the first embodiment of the disclosure.

FIG. 8 is a diagram illustrating the pseudo code of a voice recognition program performed in the smartphone of the real-time voice recognition apparatus including an ASIC chip and a smartphone according to the first embodiment of the disclosure.

MODE FOR INVENTION

Figure 1:
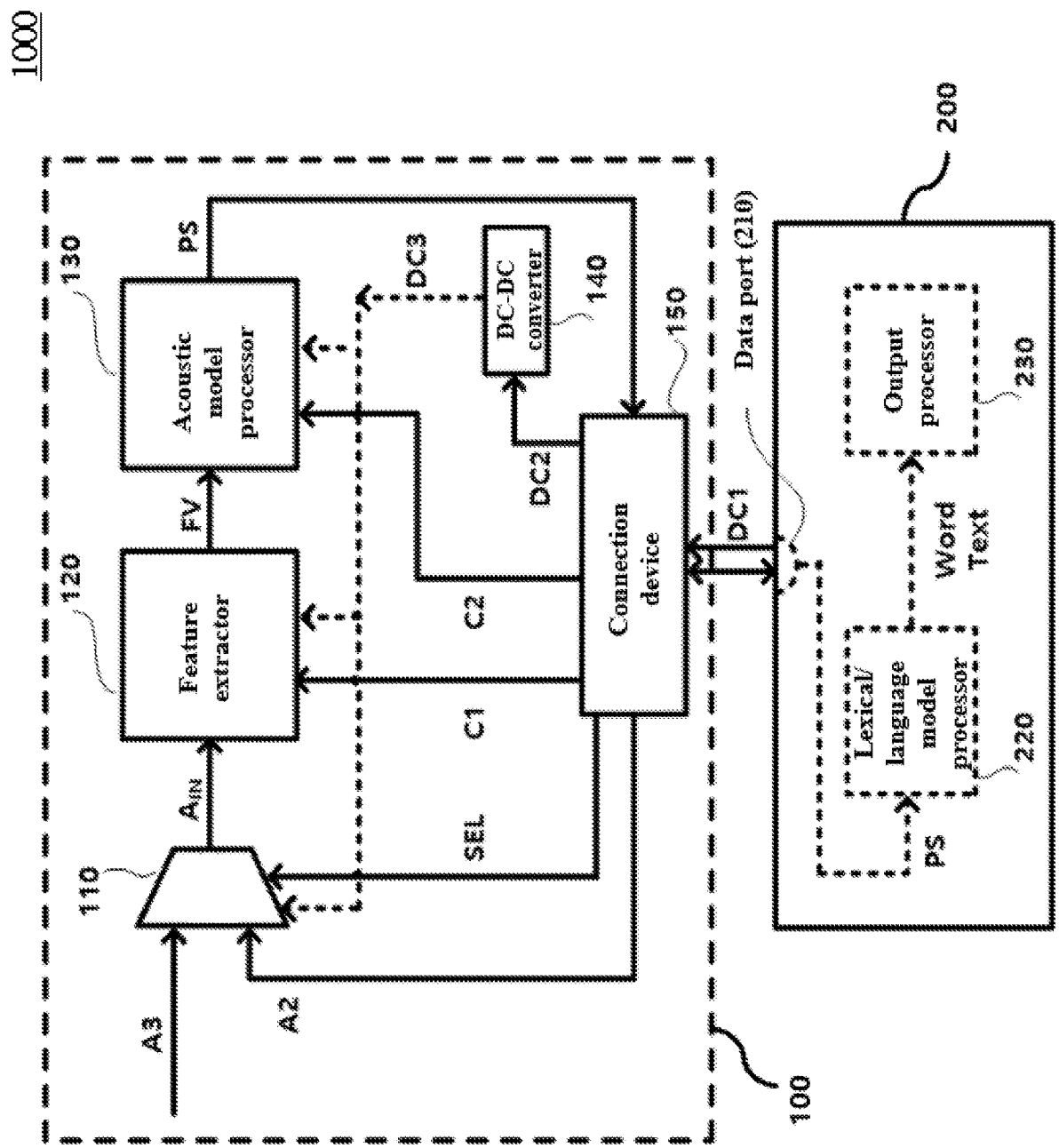
FIG. 1 is a block diagram of a real-time voice recognition apparatus including an ASIC chip and a smartphone according to a first embodiment of the disclosure.

The disclosure is to implement a voice recognition apparatus which can have a short delay time and no privacy problem, and perform real-time processing.

In order to enable real-time processing, the time taken for a voice recognition apparatus to process voice data for given determined duration needs to be shorter than the duration of the voice data. In order to quantitatively indicate real-time processing, a value obtained by dividing voice data duration necessary for a voice recognition apparatus to process voice data at a time by the voice data processing time of the voice recognition apparatus is defined as a real-time factor. For a real-time operation, the real-time factor needs to be greater than 1.0. In the case of Kaldi that is a common voice recognition program, it has been known that a real-time operation is impossible to perform because the real-time factor is 0.55 if the real-time operation is performed using a 3.7 GHz-clock CPU of a personal computer (PC).

However, in order to achieve a real-time voice recognition operation having no privacy problem, a voice recognition operation needs to be capable of being rapidly processed using a terminal, such as a smartphone, without using a cloud computer. A voice recognition processing process is configured as follows. An input audio speech is converted into word text sequentially through feature extraction, acoustic model processing, and a lexical/language model processing process.

In order to implement a voice recognition apparatus in a software way, if a voice recognition operation is performed using only a current smartphone, that is, a representative terminal, a real-time operation is difficult to perform by a current smartphone technology because a processing time is lengthened.

In order to implement a voice recognition apparatus in a hardware way, if an external ASIC chip is connected to a data port of a smartphone in a dongle form, an audio speech input to the smartphone is transmitted to the ASIC chip, and the ASIC chip converts the received audio speech into word text and transmits the word text to the smartphone, a real-time voice recognition apparatus having no privacy problem and a very short delay time may be implemented.

It is however difficult to implement a high-capacity memory (100 Mbits or more) necessary to store a word dictionary and sentence dictionary necessary for lexical/language model processing, that is, one process of voice recognition processing, in one ASIC chip along with a logic circuit using a current technology. Accordingly, a current technology makes it difficult to implement a voice recognition apparatus using only a hardware method.

Accordingly, in the disclosure, a co-design method of hardware and software is used to implement a real-time voice recognition apparatus which has no privacy problem and a short delay time although a current technology is used.

That is, feature extraction and acoustic model processing that require a lot of time due to a relatively complicated calculation process are performed in a hardware way and lexical/language model processing that requires a high-capacity memory is performed in a software way in a smartphone using one external ASIC chip. In an embodiment of the disclosure, in order to facilitate a hardware ASIC chip implementation, a gated recurrent unit (GRU)-RNN method known to have the smallest hardware size among RNN methods currently commonly used a lot in voice recognition is used. The spirit of the disclosure may be applied to all LSTM-RNN methods.

Parallel processing is performed by storing a word dictionary and sentence dictionary necessary for lexical/language model processing in a memory unit, such as a flash memory or DRAM embedded in a smartphone, and driving the central processing unit (CPU) and GPU of an application processor (AP), embedded in the smartphone, at the same time in order to minimize the time taken for the lexical/language model processing. A GPU parallel processing program may be facilitated using an open computing language (hereinafter referred to as an "OpenCL") developed for a general purpose GPU (GPGPU) program.

An embodiment of the disclosure is divided into two types of a first embodiment and a second embodiment and described. In the first embodiment, a real-time voice recognition apparatus is configured using one ASIC chip and one smartphone. In the second embodiment, a real-time voice recognition apparatus is configured using one ASIC chip, one DRAM chip and one smartphone by adding the one DRAM chip to the elements of the first embodiment.

Hereinafter, the disclosure is described more specifically with reference to the accompanying drawings.

FIG. 1 is a block diagram of a real-time voice recognition apparatus 1000 including an ASIC chip and a smartphone according to the first embodiment of the disclosure.

Referring to FIG. 1, the real-time voice recognition apparatus 1000 including an ASIC chip and a smartphone according to the embodiment of the disclosure includes an ASIC chip 100 which receives a first digital audio speech ($A_{IN}$) as an input, outputs a feature vector (FV), and outputs a phoneme score (PS) from the feature vector (FV) and a smartphone 200 which is connected to the ASIC chip through a data port, receives the phoneme score (PS) as an input from the ASIC chip, outputs word text, and processes and outputs the word text according to user needs.

More specifically, the ASIC chip 100 includes an input signal selector 110, a feature extractor 120, an acoustic model processor 130, a DC-DC converter 140 and a connection device 150.

The input signal selector 110 selects one of a second digital audio speech (A2), received by the microphone of the smartphone and transmitted to the input signal selector 110 through a data port 210 of the smartphone and the connection device 150, and a third digital audio speech (A3) received by an external microphone, not the microphone of the smartphone 200, and transmitted to the input signal selector 110, and outputs the selected digital audio speech as the first digital audio speech ($A_{IN}$).

All the second digital audio speech (A2), the third digital audio speech (A3) and the first digital audio speech ($A_{IN}$) are digitally converted audio speeches. The feature extractor 120 receives the first digital audio speech ($A_{IN}$) as an input and outputs the feature vector (FV) having 41 elements. It has been known that the human ear does not linearly identify a frequency of a Hertz unit and linearly responds to a Mel frequency m, that is, a log of a frequency. The Mel frequency m for the existing frequency f indicated in a Hertz unit is expressed by Equation 1. If a frequency band is divided into several bands at uniform intervals in a Mel frequency band, in the existing frequency band, the bands are finely divided in a low frequency band and are sparsely divided in a high frequency band.

$$m=2595*\log 10(1+f/700) \quad \text{[Equation 1]}$$

FIG. 2 is a diagram illustrating boundary frequency values of frequency bands used in the real-time voice recognition apparatus including an ASIC chip and a smartphone according to the embodiment of the disclosure.

In an embodiment of the disclosure, as illustrated in FIG. 2, the existing frequency band (fi) from 150 Hz to 7000 Hz was uniformly divided into 41 (i=1, 2, 3, . . . , 42) frequency bands in a Mel frequency band (mi). A band having the lowest frequency is a frequency band from f1=150 Hz (m1=218.8) to f2=196.9 Hz (m2=279.4).

The feature extractor 120 receives the first digital audio speech ($A_{IN}$) and one or more first control signals (C1) as an input, and outputs the feature vector (FV).

Figure 3:
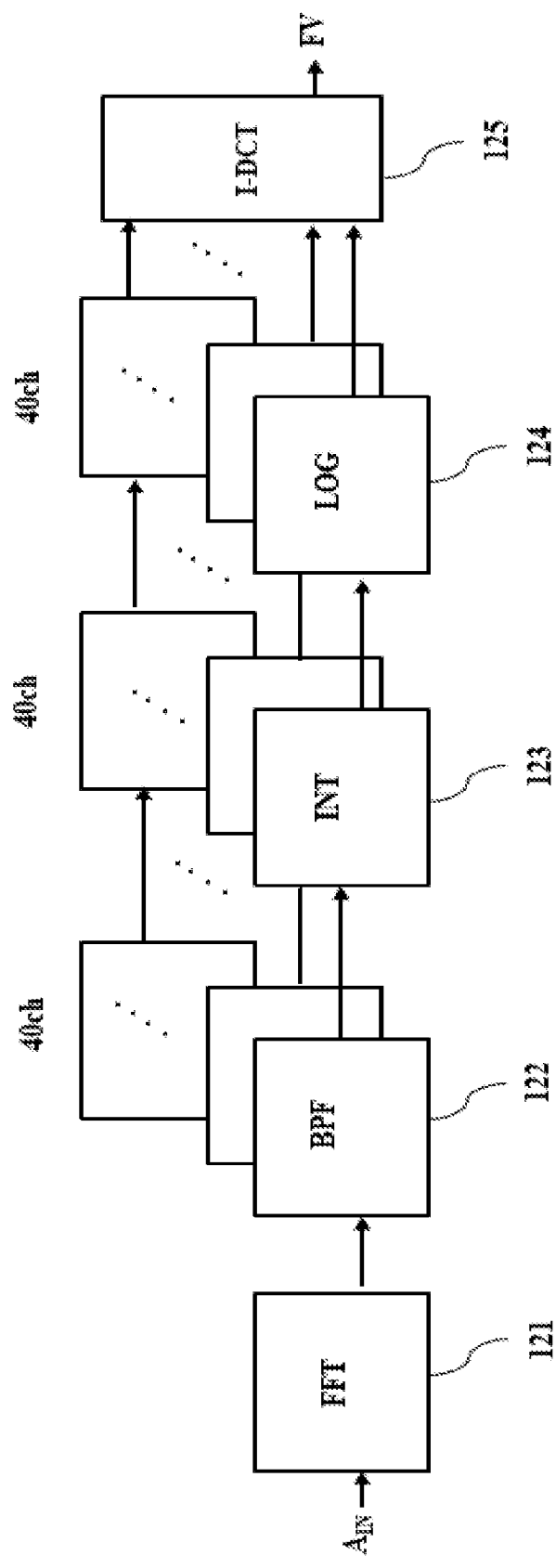
FIG. 3 is a detailed block diagram of a feature extractor of the real-time voice recognition apparatus including an ASIC chip and a smartphone according to the first embodiment of the disclosure.

The feature extractor 120 includes a fast Fourier transform (FFT) unit 121, a plurality of bandpass filters (BPFs) 122, a plurality of integrators (INTs) 123, a plurality of log units (LOGs) 124 and an inverse discrete cosine transform (I-DCT) unit 125 (refer to FIG. 3).

The acoustic model processor 130 receives the feature vector (FV) and one or more second control signals (C2) as an input, and outputs the phoneme score (PS).

Detailed configurations of the feature extractor 120 and the acoustic model processor 130 will be described later.

The DC-DC converter 140 receives a second DC voltage (DC2) as an input from the connection device 150, and outputs a third DC voltage (DC3) to the input signal selector 110, the feature extractor 120 and the acoustic model processor 130.

The connection device 150 receives the phoneme score (PS) as an input from the acoustic model processor 130, outputs the phoneme score (PS) to the smartphone 200, receives data and a first DC voltage (DC1) as an input from the smartphone 200, and outputs an input selection control signal (SEL), the first control signal (C1), the second control signal (C2) and the second DC voltage (DC2).

The connection device 150 is connected to the smartphone through the data port 210 of the smartphone, and outputs the second digital audio speech (A2) and the input selection control signal (SEL) to the input signal selector 110, outputs the one or more first control signals (C1) to the feature extractor 120, outputs the one or more second control signals (C2) to the acoustic model processor 130, and outputs the second DC voltage (DC2) to the DC-DC converter 140.

The voice recognition apparatus according to the disclosure can guarantee personal privacy related to conversation contents because it performs a voice recognition process using the external ASIC chip 100 and the smartphone 200 without using a cloud computer, can increase an operating speed by implementing the feature extractor 120 and the acoustic model processor 130, which relatively require a lot of calculation time, in the ASIC chip, and can perform real-time processing even without implementing a high-capacity memory, necessary for an operation of a lexical/language model processor 220, which requires a high-capacity memory, in the ASIC chip by performing the operation of the lexical/language model processor 220 through parallel processing software using a GPU 270 in the smartphone.

In the smartphone, audio speeches that are consecutively input over time are divided and processed in a time frame unit. In order to process the audio speeches in real time in the smartphone, the time taken for a voice recognition apparatus to process audio input data of one time frame unit (e.g., 10 ms) needs to be shorter than the unit frame duration (e.g., 10 ms). In order to quantitatively indicate a real-time operation, a real-time factor is defined as Equation 2. A real-time operation is possible to perform when the real-time factor is greater than 1.

Real-time factor={unit frame time of voice input signal processed by voice recognition apparatus at a time}/{time taken for voice recognition apparatus to process unit frame time data} [Equation 2]

In FIG. 1, when one frame data of the first digital audio speech ($A_{IN}$) is input to the feature extractor 120 within the ASIC chip, the feature extractor 120 outputs a feature vector (FV) corresponding to the input first digital audio speech.

The feature vector (FV) is configured with 41 elements by adding energy during one frame time of the first digital audio speech ($A_{IN}$) to a 40-channel Mel frequency cepstrum coefficient (MFCC) output.

The feature vector (FV) is input to the acoustic model processor 130 within the ASIC chip. The acoustic model processor 130 outputs a phoneme score (PS) corresponding to the feature vector. A phoneme corresponds to a minimum unit syllable of a speech, and phonemes are commonly divided into about 40 to 61 phonemes in the case of English and Hangeul. In an embodiment of the disclosure, the number of phoneme scores (PSs) is 61 by adding a margin necessary for a training process.

The phoneme score indicates a vector value in the form of a table in which the probability that the feature vector will correspond to each phoneme is calculated. When the phoneme score (PS) is input to the smartphone, the smartphone searches for a word corresponding to the phoneme score by driving the program of the lexical/language model processor 220, and outputs the retrieved word as word text. The output word text is input to the program of an output processor 230 of FIG. 1 and converted into a form which can be easily used by a user.

FIG. 3 is a detailed block diagram of the feature extractor of the real-time voice recognition apparatus including an ASIC chip and a smartphone according to the disclosure.

The feature extractor 120 includes the FFT unit 121, the plurality of BPFs 122, the plurality of INTs 123, the plurality of log units 124, and the I-DCT unit 125.

The FFT unit 121 of the feature extractor 120 performs a fast Fourier transform (FFT) on an input first digital audio speech ($A_{IN}$). The output of the FFT unit 121 passes through the 40 bandpass filters (BPFs) 122. Each of the 40 INTs 123 converts 통과시켜 a power spectrum for a plurality of frequencies, that is, the output of each of the BPFs 122, into one power value (Parseval's theorem).

Thereafter, each of the plurality of log units 124 obtains a log value from the converted power value. The I-DCT unit 125 performs an inverse discrete cosine transform (I-DCT) on the obtained 40 log values and outputs 40 Mel frequency cepstrum coefficients (MFCCs).

The first digital audio speech ($A_{IN}$) input to the feature extractor 120 is 16-bit pulse code modulation (PCM) data having a sampling rate of 16 kS/sec. One frame data is obtained every 10 ms by dividing the 16-bit PCM data in a frame unit of 10 ms. The one frame data is configured with 160 16-bit data.

The one frame data of 10 ms is added to 20 ms data that was input just before the one frame data, thus producing 480 data, that is, the most recently input three frame data. 512 16-bit data are produced by adding 16 "0s" before and after the 480 data (zero padding). An FFT is performed on the 512 data. The results of the FFT indicates power spectrum values for frequencies in which the frequencies are listed at uniform frequency intervals of 31.25 Hz from 0 (DC) to 8000 Hz.

Figure 4:
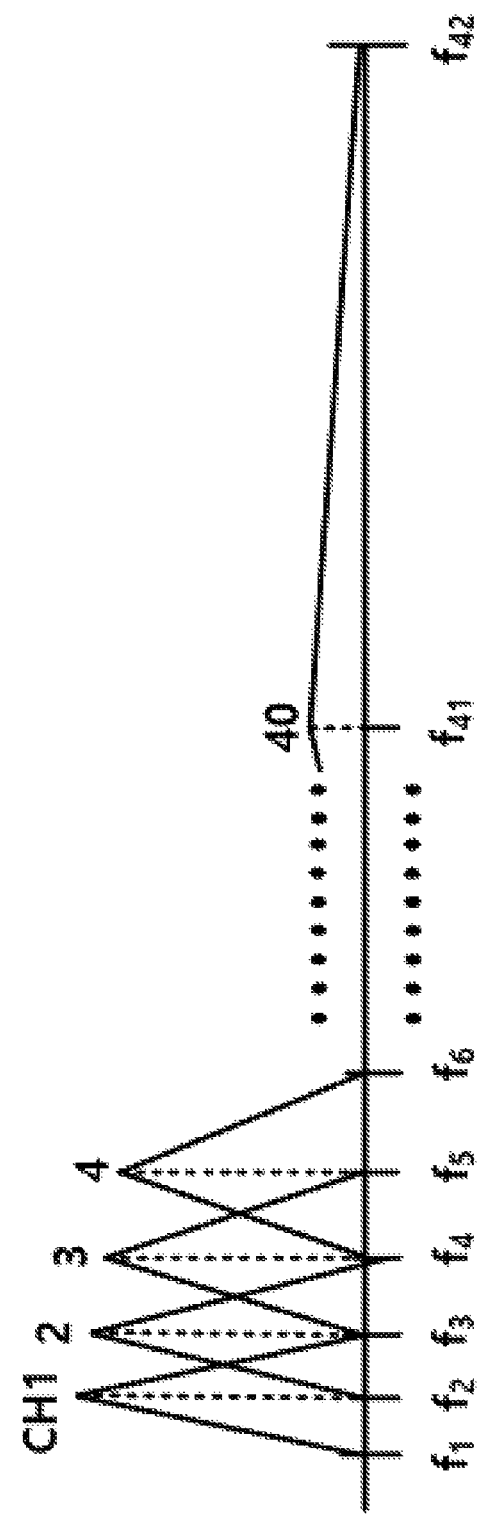
FIG. 4 is a diagram illustrating the transfer function characteristics of bandpass filters (BPFs) of FIG. 3.

FIG. 4 is a diagram illustrating the transfer function characteristics of the BPFs of FIG. 3.

Each of the 40 BPFs 122 has a transfer function of a triangular pyramid form as illustrated in FIG. 4. The transfer function has a value, which is not 0, only in two adjacent frequency bands of 41 frequency bands illustrated in FIG. 2. A coefficient value of each transfer function has been adjusted so that all the transfer functions have the same area.

In an embodiment of the disclosure, the reason why the number of samples on which a FFT is performed is set to 512 is for allowing all the 40 MFCC channels to include output spectrum values of the three or more FFT units 121. In FIG. 2, a channel from f1=150 Hz to f3=246.5 Hz, that is, a channel having the lowest frequency among the 40 MFCC channels includes a power spectrum for 3 frequencies among the FFT outputs. A channel from f40=6215 Hz to f42=7000 Hz, that is, a channel having the highest frequency includes a power spectrum for 25 frequencies among the outputs of the FFT unit 121. The reason for this is that the output power spectrum of the FFT unit 121 is output at uniform intervals of 31.25 Hz in the existing frequency band, (f3−f1)/31.25=3.1, and (f42−f40)/31.25=25.1.

Figure 5:
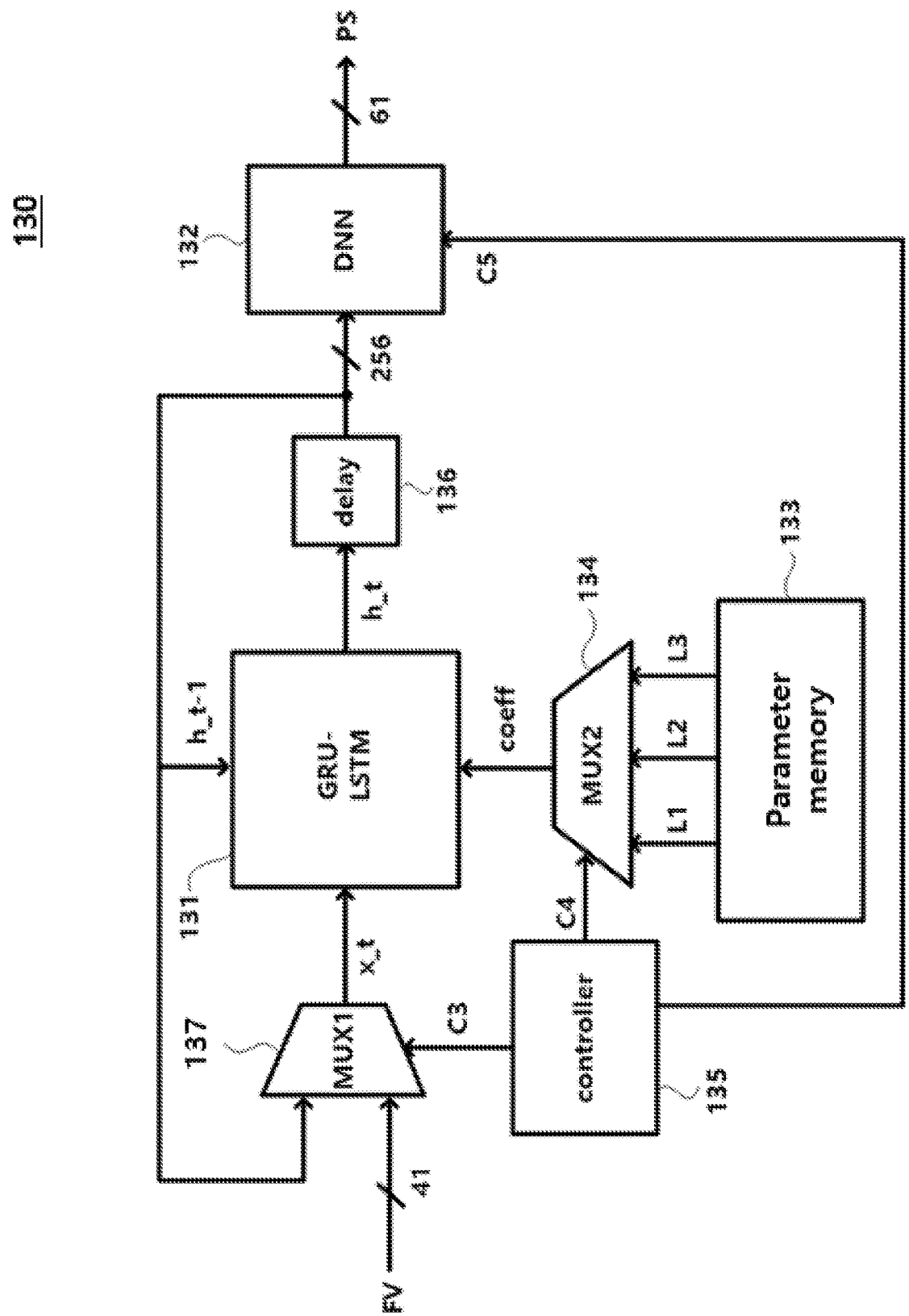
FIG. 5 is a detailed block diagram of an acoustic model processor of the real-time voice recognition apparatus including an ASIC chip and a smartphone according to the first embodiment of the disclosure.

FIG. 5 is a detailed block diagram of the acoustic model processor of the real-time voice recognition apparatus including an ASIC chip and a smartphone according to the first embodiment of the disclosure.

The acoustic model processor 130 receives the feature vector (FV), having 41 elements, as an input, and outputs a phoneme score (PS) vector having 61 elements. In an embodiment of the disclosure, the acoustic model processor 130 needs to be implemented within the ASIC chip, and thus uses a grated recurrent unit (GRU) method known as the most simplified method among long short term memory (LSTM) methods suitable for voice recognition in order to minimize a used parameter memory. However, the spirit of the disclosure may be applied to all LSTM-RNN methods.

A GRU-RNN 131 illustrated in FIG. 5 receives an input signal vector x_t, a state vector h_t−1 at a previous time, and a parameter value (param) as an input, and outputs a state vector h_t. A time delay element 136 configured with a flip-flop receives the h_t as an input and outputs the h_t−1.

A first multiplexer (MUX1) 137 receives the h_t−1, the feature vector (FV) that is the output of the feature extractor 120, and the third control signal (C3) as an input, selects one of the h_t−1 and the feature vector in response to the third control signal (C3), and outputs the selected vector as the x_t. A second multiplexer (MUX2) 134 receives L1, L2, and L3 and a fourth control signal (C4) as an input, selects one of the L1, L2, and L3 in response to the fourth control signal (C4), and outputs the selected one as the parameter value (param) of the GRU-RNN.

The parameter value (param) is an element value of 6 matrices (W, U, Wz, Uz, Wr, and Ur) and 3 vectors (bz, bh, and br) necessary for a GRU-RNN operation. A deep neural network (DNN) 132 receives the h_t−1 and a fifth control signal (C5) as an input, and outputs a phoneme score (PS) vector corresponding to the h_t−1 if the fifth control signal (C5) is in an active state.

Each of the L1, L2, and L3 is stored in a parameter memory 133 as a combination of the parameter values (param) (W, U, Wz, Uz, Wr, Ur, bz, bh, br) corresponding to the 3 layers of the GRU-RNN. A controller 135 controls an operation of each of the 3 layers by outputting a different combination of the control signals (C3, C4, and C5). In a layer 1 operation, the first multiplexer (MUX1) 137 selects the feature vector (FV) and outputs the feature vector (FV) as the x_t, and the second multiplexer (MUX2) 134 selects the L1 and outputs the L1 as the parameter value (param). In a layer 2 operation performed after the layer 1 operation, the first multiplexer (MUX1) 137 selects the h_t−1 and outputs the h_t−1 as the x_t, and the second multiplexer (MUX2) 134 selects the L2 and outputs the L2 as the parameter value (param). In a layer 3 operation performed after the layer 2 operation, the first multiplexer (MUX1) 137 selects the h_t−1 and outputs the h_t−1 as the x_t, and the second multiplexer (MUX2) 134 selects the L3 and outputs the L3 as the parameter value (param). After the layer 3 operation, the state of the fifth control signal (C5) is changed into an active state, the DNN 132 is driven to output a phoneme score (PS), and then the process is repeated starting from the layer 1 operation again.

Accordingly, the GRU-RNN operation of the three layers is performed by changing only the parameter value (param) while using one piece of GRU-RNN hardware. An internal operation of the GRU-RNN 131 of FIG. 5 is expressed by Equations 3, 4, 5, and 6.

$$h\_t = (1-z\_t) * h\_t-1 + z\_t * hin\_t \quad \text{[Equation 3]}$$

$$z\_t = \text{sigmod}\{Wz * x\_t + Uz * h\_t-1 + bz\} \quad \text{[Equation 4]}$$

$$hin\_t = \tan h\{W * x\_t + U * (r\_t * h\_t-1) + bh\} \quad \text{[Equation 5]}$$

$$r\_t = \text{sigmod}\{Wr * x\_t + Ur * h\_t-1 + br\} \quad \text{[Equation 6]}$$

The sigmod function of each of Equation 4 and Equation 6 is a function for converting a value within parentheses { } into a value between 0 and 1. The tan h function of Equation 5 is a function for converting a value within parentheses { } into a value between −1 and 1.

In an embodiment of the disclosure, in order to increase the accuracy of voice recognition, a 3-layer GRU-RNN operation is performed, and the number of states is set to 256. Accordingly, each of the Wz, Uz, W, U, Wr, and Ur in Equations 4, 5, and 6 is a 256×256 matrix. Each of the bz, bh, and br is a vector having 256 elements. Six 256×256 matrices and three 256×1 vectors are necessary for each of the three layers. A 256×61 matrix and one 256×1 vector are necessary for the DNN 132, that is, the last stage. Accordingly, the number of parameter values (param) necessary for a 3-layer GRU-RNN operation in which the number of states is 256 according to the disclosure is about 1.2 million as illustrated in Equation 7.

$$\text{Number of parameters} = \{256 \times 256 \times (6 \text{ matrices}) + 256 \times (3 \text{ vectors})\} \times (3 \text{ layers}) + 256 \times 61 + 61 = 1,197,629 \quad \text{[Equation 7]}$$

About 2.2 million parameter values (param) are necessary for a common LSTM structure, not a GRU structure. Accordingly, in an embodiment of the disclosure, the number of parameters of a GRU-RNN structure is about 45% smaller than that of an LSTM-RNN structure.

Figure 6:
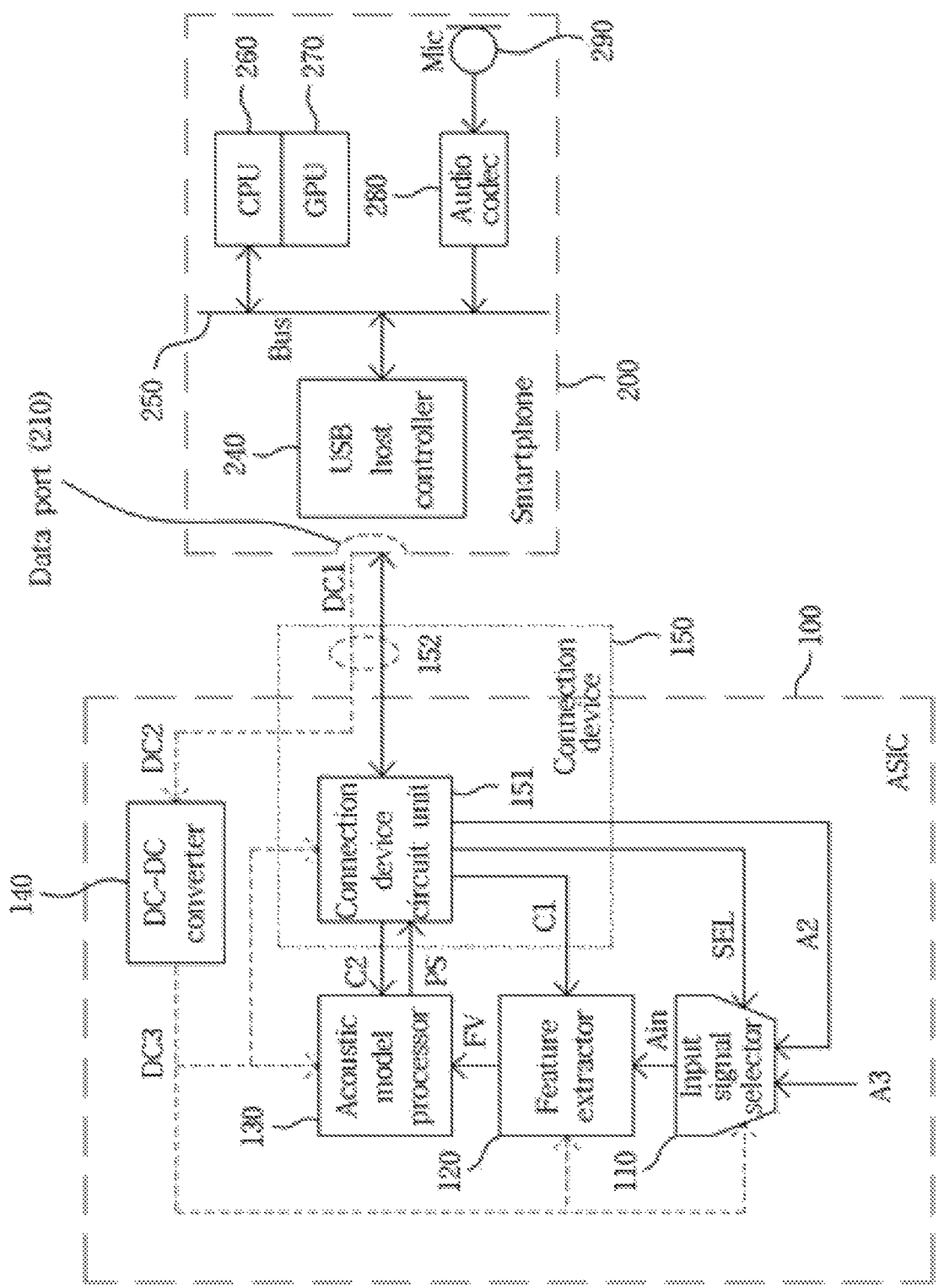
FIG. 6 is a detailed block diagram of a connection device and a smartphone in the first embodiment of the disclosure illustrated in FIG. 1.

FIG. 6 is a detailed block diagram of the connection device and the smartphone in the first embodiment of the disclosure illustrated in FIG. 1.

The connection device 150 includes a connection device circuit unit 151 and an electrical connection device 152 that are included in the ASIC chip 100. The connection device circuit unit 151 is a circuit unit of a USB PHY/LINK form and uses the USB 1.1 or USB 2.0 standard.

The electrical connection device 152 is used to connect the connection device circuit unit 151 to the data port 210 of the smartphone 200. The electrical connection device 152 is configured with a connector or a combination of a connector and a cable. The connector or the cable includes 4 lead wires of D+, D−, VBUS, and GND depending on the USB 1.1/USB 2.0 standard. In the case of the cable, the cable colors of the lead wires D+, D−, VBUS, and GND are green, white, red and black, respectively.

When FIG. 6 is compared with FIG. 1, the electrical connection device 152 of the connection device 150 is supplied with the first DC voltage (DC1) of 5V from the smartphone 200 through the lead wires VBUS and GND, and supplies the first DC voltage (DC1) of 5V to the DC-DC converter 140 as the second DC voltage (DC2) by bypassing the first DC voltage (DC1) of 5V without any change.

Accordingly, the ASIC chip 100 according to the disclosure does not additionally require an external power device because it is supplied with DC power from the smartphone 200. The electrical connection device 152 of the connection device 150 configures a bi-directional differential signal transmission line using the lead wires D+, D−, and GND, and connects the connection device circuit unit 151 and the data port 210 of the smartphone 200.

The differential signal transmission line is used to transmit an audio speech, received by a microphone 290 embedded in the smartphone 200, to the input signal selector (MUX) 110 embedded in the ASIC chip 100 as a second digital audio speech (A2) input. To this end, the audio speech received by the microphone 290 sequentially passes through an audio codec 280, a smartphone bus 250, an USB host controller 240, and the smartphone data port 210, which are embedded in the smartphone, and the electrical connection device 152 and connection device circuit unit 151 of the connection device 150, and is input to the input signal selector (MUX) 110.

Furthermore, the bi-directional differential signal transmission line is used to transmit a control signal or data from a CPU 260 of the smartphone to the input signal selector 110, the feature extractor 120 and the acoustic model processor 130 of the ASIC chip or to transmit a phoneme score (PS), output by the acoustic model processor 130 of the ASIC chip, to the CPU 260 or the GPU 270 of the smartphone.

Figure 7:
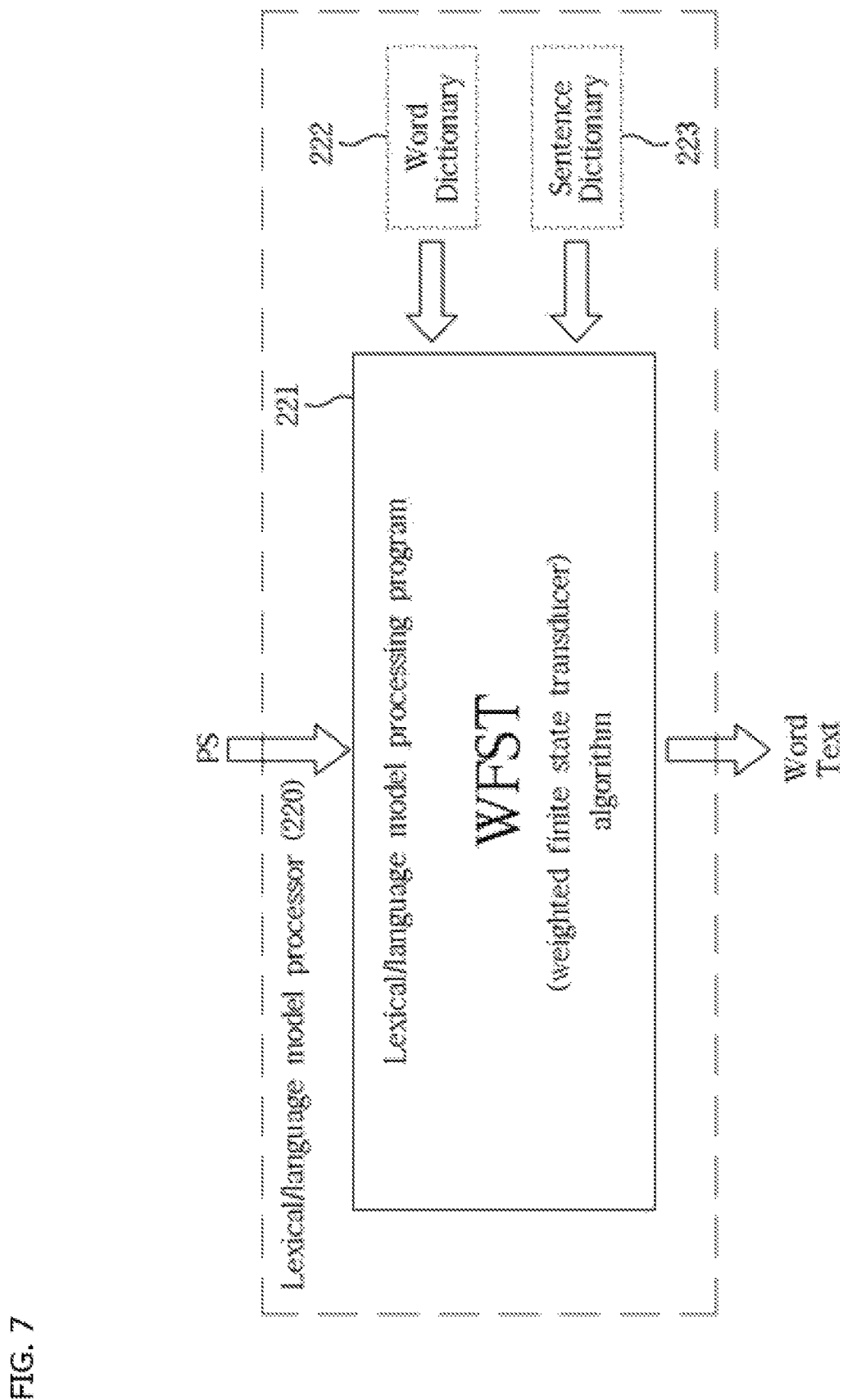
FIG. 7 is a concept view for describing an operation of a lexical/language model processor of the real-time voice recognition apparatus including an ASIC chip and a smartphone according to the first embodiment of the disclosure.

FIG. 7 is a concept view for describing a program operation of the lexical/language model processor of the real-time voice recognition apparatus including an ASIC chip and a smartphone according to the disclosure.

It is difficult to perform lexical/language model processing in an ASIC chip using a hardware method because a word dictionary and sentence dictionary having a massive amount are necessary for the lexical/language model processing. Accordingly, in the disclosure, the lexical/language model processing is performed in a software way using the smartphone.

Recently, in the embedded memory capacity of a smartphone, the capacity of a DRAM is about 4 Gbytes and the capacity of a flash memory is about 64 Gbytes. It is expected that the embedded memory capacity will be further increased in the future. Accordingly, a personal dictionary having hundreds of thousands of entry words can be easily stored in a smartphone memory. The number of entry words of the second edition of the Oxford English Dictionary is about 290,000. The entry words may be stored in a memory of about 6 Mbytes.

In the disclosure, it is difficult to perform parallel processing using a graphics processing unit (GPU) through a GRU-RNN algorithm used for acoustic model processing because data results right before are used for next calculation. Accordingly, in the disclosure, when a program of the lexical/language model processor is performed, the GRU-RNN algorithm is not used, but a weighted finite state transducer (WFST) algorithm is used.

In the existing voice recognition apparatus, a hidden Markov model (HMM) and an n-gram model are chiefly used for lexical/language model processing. However, with respect to the number S of states, a data size that is processed in the HMM is proportional to an S square ($O(S^2)$), whereas the data size is proportional to S in the WFST ($O(S)$). Accordingly, recently, the WFST is chiefly used for lexical model processing instead of the HMM. The capacity size of a dictionary necessary for data processing in the n-gram model is very large, that is, several hundreds of Mbytes, whereas the capacity size of a dictionary in the WFST is much smaller than that of the n-gram model. Accordingly, recently, the WFST model is used a lot for language model processing instead of the n-gram model.

As illustrated in FIG. 1, the lexical/language model processor 220 receives a phoneme score (PS) as an input and outputs word text. In an embodiment of the disclosure, the lexical/language model processor 220 has adopted a software method using the CPU/GPU of the AP and a memory device included in the smartphone.

In the concept view of the lexical/language model processor of FIG. 7, the lexical/language model processor 220 according to an embodiment of the disclosure is configured with a lexical/language model processing program 221 performed in the CPU/GPU of the smartphone, and a word dictionary 222 and a sentence dictionary 223, which are stored in a DRAM, that is, one of the memory storage elements of the smartphone. In an embodiment of the disclosure, a lexical/language model is not separated into two steps of a lexical model and a language model, but a lexical model and a language model are bundled and processed as one step. The lexical/language model processing program 221 applies a WFST algorithm to the input phoneme score (PS), and outputs the word text using the word dictionary 222 and the sentence dictionary 223.

Furthermore, in the disclosure, a real-time operation has been secured by minimizing the execution time of the lexical/language model processing program 221 using a general purpose (GP) GPU parallel program based on OpenCL to the maximum.

FIG. 8 is a diagram illustrating the pseudo code of a voice recognition program performed in the smartphone of the real-time voice recognition apparatus including an ASIC chip and a smartphone according to the disclosure.

If OpenCL is used, a parallel GPU program can be fabricated relatively easily.

Figure 9:
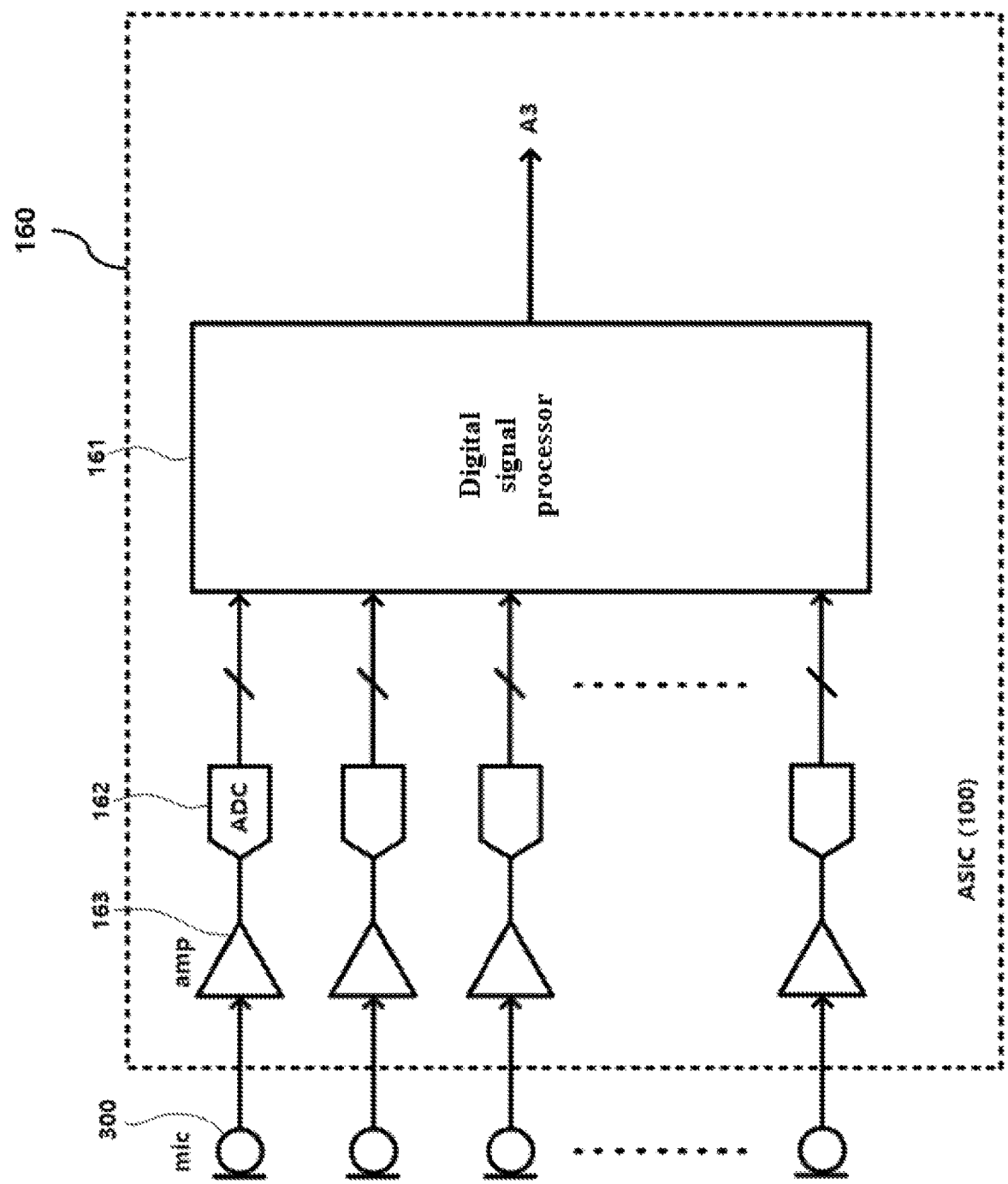
FIG. 9 is a block diagram of a third digital audio speech generator of the real-time voice recognition apparatus including an ASIC chip and a smartphone according to the first embodiment of the disclosure.

FIG. 9 is a circuit diagram of a third digital audio speech generator of the real-time voice recognition apparatus including an ASIC chip and a smartphone according to the disclosure.

The third digital audio speech generator 160 processes a plurality of analog signals received by a plurality of microphones 300 and outputs the results of the processing as the one third digital audio speech (A3). To this end, the third digital audio speech generator 160 includes a plurality of analog amplifiers 163 for receiving the output signals of the plurality of microphones 300 as respective inputs and outputting amplified analog signals, a plurality of analog-digital converters 162 for receiving the outputs of the analog amplifiers as respective inputs and outputting digital signals, and one digital signal processor 161 for receiving all the outputs of the plurality of analog-digital converters as inputs and outputting the one third digital audio speech (A3).

The digital signal processor 161 includes a beamforming and noise reduction function. The plurality of analog amplifiers 163, the plurality of analog-digital converters 162 and the one digital signal processor 161 may be implemented in the one ASIC chip 100 along with the input signal selector 110, the feature extractor 120, the acoustic model processor 130, the DC-DC converter 140 and the connection device circuit unit 151.

Figure 10:
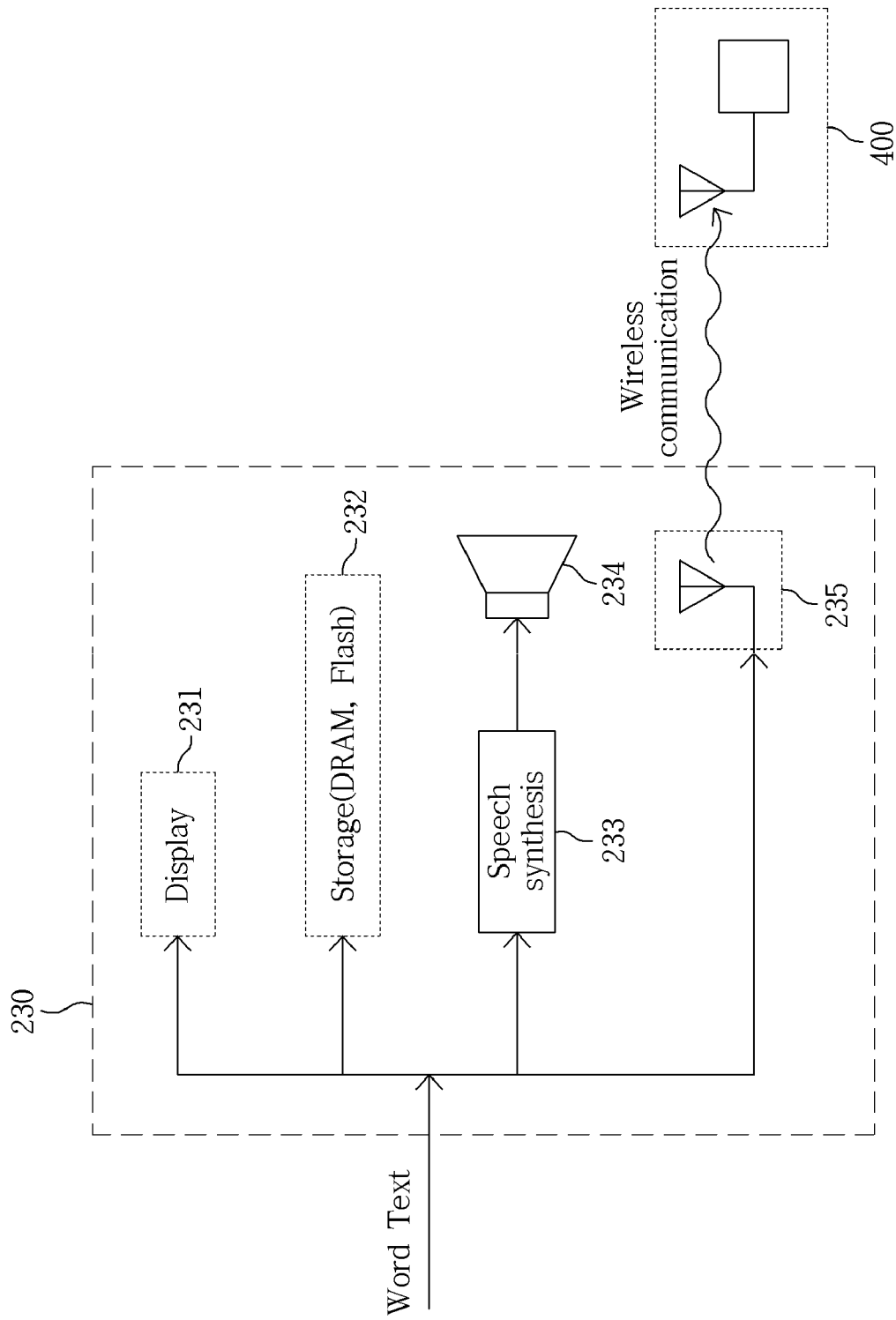
FIG. 10 is a diagram for describing a program operation of an output processor of the real-time voice recognition apparatus including an ASIC chip and a smartphone according to the first embodiment of the disclosure.

FIG. 10 is a diagram for describing a program operation of the output processor of the real-time voice recognition apparatus including an ASIC chip and a smartphone according to the disclosure.

The output processor 230 of the real-time voice recognition apparatus including an ASIC chip and a smartphone according to the disclosure converts word text, that is, the output of the lexical/language model processor 220, through a program function so that the word text can be conveniently used by a user.

That is, the output processor 230 may display word text, that is, the output of the lexical/language model processor 220, on a display 231 of the smartphone 200, may store the word text in a memory 232 of the smartphone, may convert the word text into a voice through a voice synthesis device 233, and may output the voice through a speaker 234 connected to the smartphone in a wired or wireless manner or transmit the voice to another device 400 outside the smartphone through a wireless transmitter 235 of the smartphone.

Figure 11:
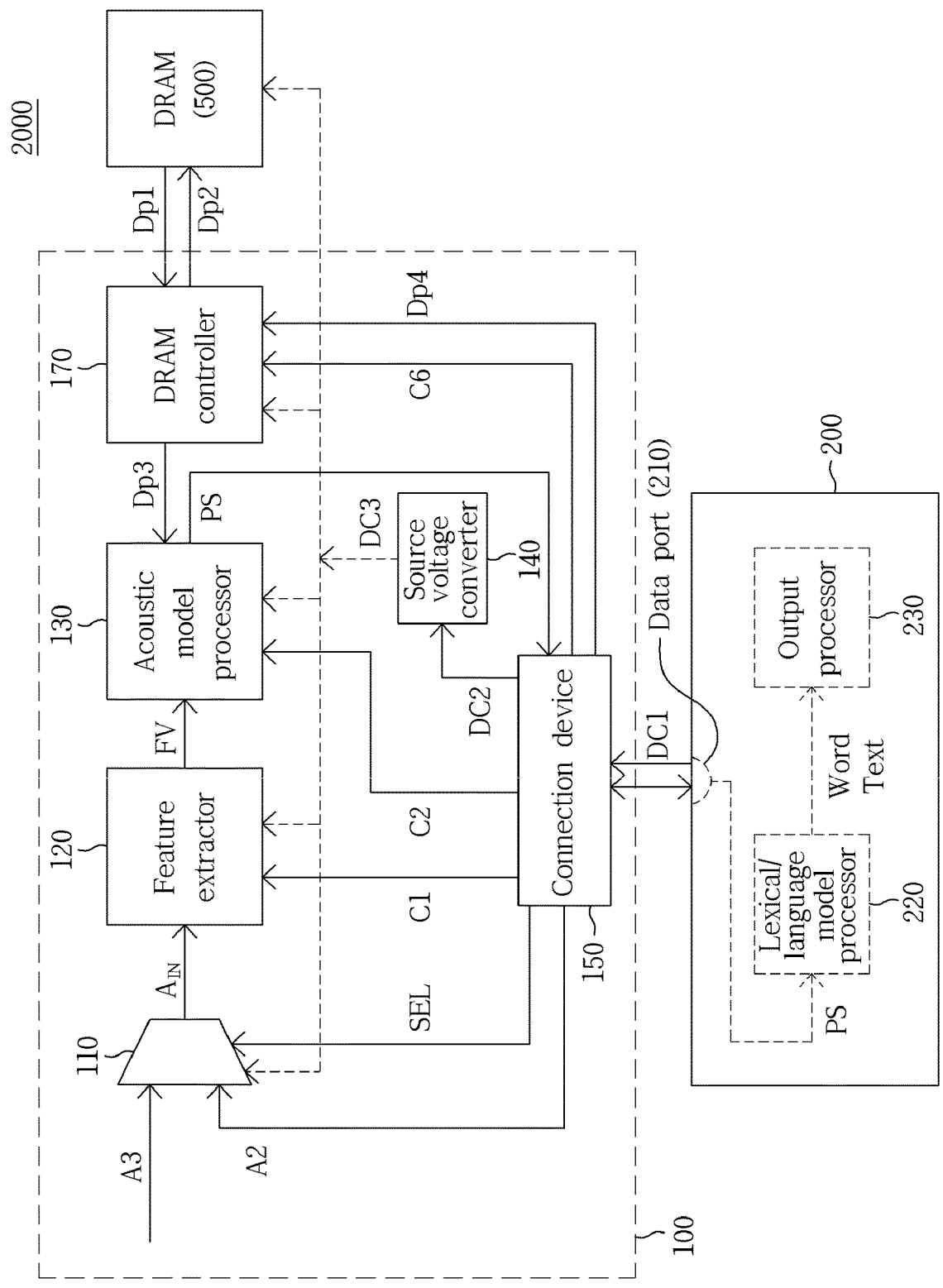
FIG. 11 is a block diagram of a real-time voice recognition apparatus including an ASIC chip and a smartphone according to a second embodiment of the disclosure.

FIG. 11 is a block diagram of a real-time voice recognition apparatus including an ASIC chip and a smartphone according to a second embodiment of the disclosure.

When FIG. 11 is compared with FIG. 1, in FIG. 11, a DRAM chip 500, a DRAM controller 170 and five signals have been added to FIG. 1. The five signals are first parameter data (Dp1), second parameter data (Dp2), third parameter data (Dp3), fourth parameter data (Dp4) and a sixth control signal (C6). In the first embodiment of the disclosure, in order to implement a GRU-RNN in which the number of neural network layers is 3 and the number of states is 250, approximately 1.2 million parameters are necessary (Equation 7). The 1.2 million parameters are stored in the parameter memory 133 of the acoustic model processor 130 illustrated in FIG. 5.

In the first embodiment of the disclosure, a very wide chip area is necessary to fabricate the parameter memory 133 within the ASIC chip in a static random access memory (SRAM) form. Accordingly, in the first embodiment of the disclosure, it is difficult to increase the number of neural network layers to 4 or more due to a limited chip area of the parameter memory 133. Recently, the number of neural network layers is 7 in a voice recognition apparatus having word accuracy of 95% or more.

In the second embodiment of the disclosure, in order to improve word accuracy by increasing the number of neural network layers to 8 or more, the separate DRAM chip 500 is added and a parameter necessary for a GRU-RNN operation is stored in the DRAM chip. A parameter value necessary to execute a GRU-RNN operation is read from the DRAM chip 500 whenever the need arises. To this end, the DRAM chip 500 outputs the first parameter data (Dp1). The DRAM controller 170 receives the first parameter data (Dp1) and outputs the third parameter data (Dp3). The acoustic model processor 130 receives the third parameter data (Dp3) and performs a GRU-RNN operation. In a neural network training process, parameter values are downloaded from the smartphone 200 to the DRAM chip 500. To this end, the connection device 150 receives data from the smartphone 200 through the data port 210 and outputs the sixth control signal (C6) and the fourth parameter data (Dp4).

The DRAM controller 170 receives the sixth control signal (C6) and the fourth parameter data (Dp4), and outputs the fourth parameter data (Dp4) as the second parameter data (Dp2) in response to the sixth control signal. The DRAM chip 500 receives the second parameter data (Dp2) and stores the second parameter data (Dp2) in the DRAM chip 500. The DRAM chip 500 is a graphic DRAM. The first parameter data (Dp1), the second parameter data (Dp2) and the third parameter data (Dp3) are digital binary signals of 8 bits or more.

Figure 12:
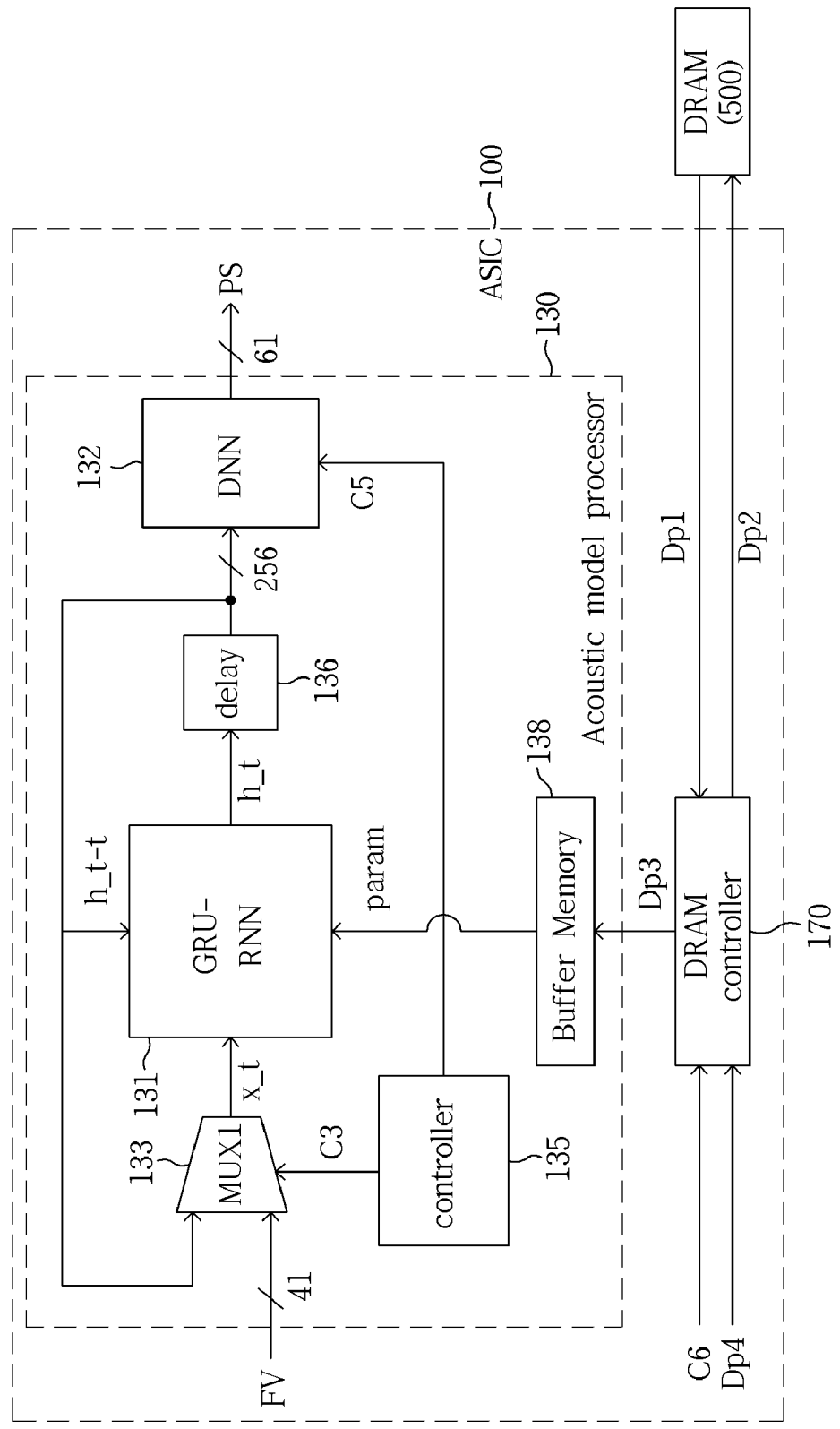
FIG. 12 is a detailed block diagram of an acoustic model processor of the real-time voice recognition apparatus including an ASIC chip and a smartphone according to the second embodiment of the disclosure.

FIG. 12 is a detailed block diagram of the acoustic model processor of the real-time voice recognition apparatus including an ASIC chip and a smartphone according to the second embodiment of the disclosure.

The DRAM controller 170 receives the sixth control signal (C6), that is, an output signal of the connection device 150, and the first parameter data (Dp1), that is, an output signal of the DRAM chip 500, as an input, and outputs the first parameter data (Dp1) as the third parameter data (Dp3) in response to the sixth control signal. A buffer memory 138 receives the third parameter data (Dp3) as an input and outputs a parameter value (param). The parameter value (param) is input to the GRU-RNN 131 and substituted with element values of the six matrices (Wz, Uz, W, U, Wr and Ur) of Equation 4, Equation 5 and Equation 6.

If the GRU-RNN is configured with 250 parallel multiplier and accumulators (MACs), the parameter value (param) indicates 250 parameter values. If one parameter is 16 bits, the parameter value (param) is a signal having 250×16=4,096-bit. If the third parameter data (Dp3) is a 32-bit binary digital signal, the number of bits of the input signal (Dp3) of the buffer memory 138 and the number of bits of the output signal (param) of the buffer memory 138 are 32 bits and 4,096 bits, respectively. Accordingly, the buffer memory 138 functions to adjust the number of bits of the input signal and the number of bits of the output signal because the number of bits of the input signal and the number of bits of the output signal are different.

If the GRU-RNN is configured with 250 parallel MACs and the DRAM chip 500 is a graphic DRAM that outputs 5-Gbps 32 bits in parallel using the graphic double data rate 5 (GDDR5) standard, the data bandwidth of each of the first parameter data (Dp1), the second parameter data (Dp2), and the third parameter data (Dp3) is 32×5 Gbps=160 Gbps.

The data bandwidth of each of the third parameter data (Dp3) and the parameter value (param) is 160 Gbps by an operation of the buffer memory 138. Furthermore, if one parameter is 16 bits, the operation clock speed of the GRU-RNN configured with the 250 parallel MACs in the above case needs to be 160 Gbps/(250×16)=40 MHz or less.

Figure 13:
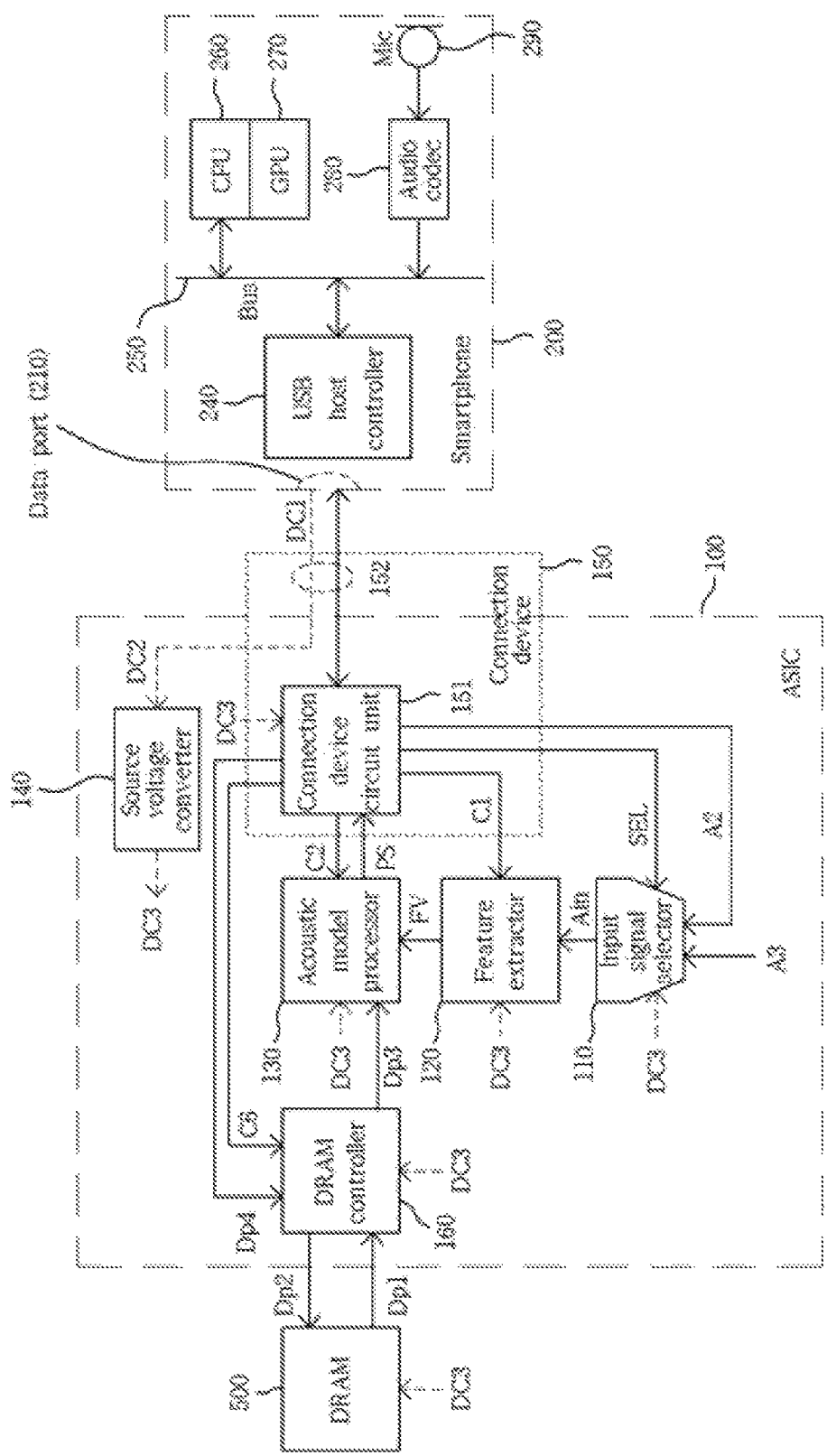
FIG. 13 is a detailed block diagram of a connection device and a smartphone in the second embodiment of the disclosure.

FIG. 13 is a detailed block diagram of the connection device and the smartphone in the second embodiment of the disclosure. The DRAM chip 500 uses the third DC voltage (DC3), supplied by the ASIC chip 100, as a supply voltage.

The preferred embodiments of the disclosure have been described above in detail, but the scope of rights of the disclosure is not limited thereto and may be implemented as more various embodiments based on the basic concept of the disclosure defined in the following claims. Accordingly, such embodiments also fall within the scope of rights of the disclosure.

The invention claimed is:

1. A real-time voice recognition apparatus comprising an ASIC chip and a smartphone, the apparatus comprising:
an ASIC chip configured to receive a first digital audio speech as an input, generate a feature vector, and output a phoneme score from the feature vector; and
a smartphone connected to the ASIC chip through a data port and configured to receive the phoneme score from the ASIC chip as an input, output word text, and process and output the word text according to user needs,
wherein the ASIC chip comprises:
an input signal selector configured to select one of a second digital audio speech and a third digital audio speech in response to an input selection control signal (SEL) and output the selected audio speech as the first digital audio speech ($A_{IN}$);
a feature extractor configured to receive the first digital audio speech and one or more first control signals (C1) as an input and output the feature vector;
an acoustic model processor configured to receive the feature vector and one or more second control signals (C2) as an input and output the phoneme score;
a connection device configured to receive the phoneme score from the acoustic model processor as an input, output the received phoneme score to the smartphone, receive data and a first DC voltage (DC1) as an input from the smartphone, and output the second digital audio speech, the input selection control signal (SEL), the first control signal (C1), the second control signal (C2) and the second DC voltage (DC2); and
a DC-DC converter configured to receive the second DC voltage (DC2) as an input and output a third DC voltage (DC3).

2. The real-time voice recognition apparatus of claim 1, wherein the connection device is connected to the smartphone through the data port of the smartphone, outputs the second digital audio speech (A2) and the input selection control signal (SEL) to the input signal selector, outputs the one or more first control signals to the feature extractor, outputs the one or more second control signals to the acoustic model processor, and outputs the second DC voltage (DC2) to the DC-DC converter.

3. The real-time voice recognition apparatus of claim 2, wherein the connection device comprises:
a connection device circuit unit included in the ASIC chip; and
an electrical connection device connected to the data port of the smartphone through a connector or a cable.

4. The real-time voice recognition apparatus of claim 3, wherein the connection device is supplied with power from the smartphone through the electrical connection device.

5. The real-time voice recognition apparatus of claim 1, wherein the DC-DC converter outputs the third DC voltage (DC3) to the connection device, the input signal selector, the feature extractor and the acoustic model processor.

6. The real-time voice recognition apparatus of claim wherein the acoustic model processor uses a recurrent neural network (RNN) algorithm of a long short term memory (LSTM) or gated recurrent unit (GRU) method.

7. The real-time voice recognition apparatus of claim 1, wherein the ASIC chip further comprises the third digital audio speech generator configured to generate a third digital audio speech and provide the third digital audio speech for the input signal selector.

8. The real-time voice recognition apparatus of claim 7, wherein the third digital audio speech generator comprises:
at least one analog amplifier configured to receive at least one analog audio signal, output by an external microphone, as an input, amplify the received analog audio signal, and output at least one analog output signal;
at least one analog-digital converter configured to receive the at least one analog output signal as an input and output at least one digital audio speech; and
a digital signal processor configured to receive the at least one digital audio speech as an input and output one third digital audio speech,
wherein the digital signal processor comprises a beamforming function.

9. The real-time voice recognition apparatus of claim 1, wherein the smartphone comprises:

a lexical/language model processor configured to receive the phoneme score as an input from the ASIC chip and perform a lexical/language model processing function by outputting word text; and an output processor configured to receive the word text as an input and perform a function for outputting and processing the word text according to user needs.

10. The real-time voice recognition apparatus of claim 9, wherein the output processor displays the word text on a display embedded in the smartphone, stores the word text in a memory unit of the smartphone, and transmits the word text to an external device using a wireless communication function of the smartphone, or the smartphone synthesizes the word text in a voice form and outputs the word text to a voice output device embedded in the smartphone or an external voice output device connected to the smartphone in a wired or wireless manner.

11. A real-time voice recognition apparatus comprising an ASIC chip and a smartphone, the apparatus comprising:
a DRAM chip configured to output first parameter data (Dp1) and receive second parameter data (Dp2) as an input;
an ASIC chip configured to receive a first digital audio speech and the first parameter data (Dp1) as an input and output a phoneme score (PS) and the second parameter data (Dp2); and
a smartphone connected to the ASIC chip through a data port and configured to receive the phoneme score as an input from the ASIC chip, output word text, and process and output the word text according to user needs,
wherein the ASIC chip comprises:
an input signal selector configured to select one of a second digital audio speech and a third digital audio speech in response to an input selection control signal (SEL) and output the selected audio speech as the first digital audio speech ($A_{IN}$);
a feature extractor configured to receive the first digital audio speech and one or more first control signals (C1) as an input and output the feature vector;
an acoustic model processor configured to receive the feature vector, one or more second control signals (C2) and a third parameter data (Dp3) as an input and output the phoneme score;
a DRAM controller configured to receive the first parameter data (Dp1), a fourth parameter data (Dp4), and one or more sixth control signals (C6) as an input and output the second parameter data and the third parameter data;
a connection device configured to receive the phoneme score as an input from the acoustic model processor, output the received phoneme score to the smartphone, receive data and a first DC voltage (DC1) as an input from the smartphone, and output the second digital audio speech (A2), the fourth parameter data (Dp4), the input selection control signal (SEL), the first control signal (C1), the second control signal (C2), the sixth control signal (C6) and the second DC voltage (DC2); and
a DC-DC converter configured to receive the second DC voltage (DC2) as an input and output a third DC voltage (DC3).

12. The real-time voice recognition apparatus of claim 11, wherein the connection device is connected to the smartphone through the data port of the smartphone, outputs the second digital audio speech (A2) and the input selection control signal (SEL) to the input signal selector, outputs the one or more first control signals to the feature extractor, outputs the one or more second control signals to the acoustic model processor, outputs the one or more sixth control signals and the fourth parameter data to the DRAM controller, and outputs the second DC voltage (DC2) to the DC-DC converter.

13. The real-time voice recognition apparatus of claim 11, wherein the DC-DC converter outputs the third DC voltage (DC3) to each of the input signal selector, the feature extractor, the acoustic model processor, the connection device, the DRAM controller and the DRAM chip,
wherein the DRAM chip is supplied with all DC supply voltages necessary for an operation of the DRAM chip from the ASIC chip.

14. The real-time voice recognition apparatus of claim 11, wherein each of the first parameter data (Dp1) and the second parameter data (Dp2) is a binary digital signal having the number of bits of 8 bits or more.

15. The real-time voice recognition apparatus of claim 12, wherein the connection device is supplied with power from the smartphone through an electrical connection device connected to the data port of the smartphone through a connector or a cable.

16. The real-time voice recognition apparatus of claim 11, wherein the acoustic model processor uses a recurrent neural network (RNN) algorithm of a long short term memory (LSTM) or gated recurrent unit (GRU) method.

17. The real-time voice recognition apparatus of claim 11, wherein the ASIC chip further comprises a third digital audio speech generator configured to generate the third digital audio speech and provide the third digital audio speech for the input signal selector.

18. The real-time voice recognition apparatus of claim 17, wherein the third digital audio speech generator comprises:
at least one analog amplifier configured to receive at least one analog audio signal, output by an external microphone, as an input, amplify the received analog audio signal, and output at least one analog output signal;
at least one analog-digital converter configured to receive the at least one analog output signal as an input and output at least one digital audio speech; and
a digital signal processor configured to receive the at least one digital audio speech as an input and output one third digital audio speech,
wherein the digital signal processor comprises a beamforming function.

19. The real-time voice recognition apparatus of claim 11, wherein the smartphone comprises:
a lexical/language model processor configured to receive the phoneme score as an input from the ASIC chip and perform a lexical/language model processing function by outputting word text; and
an output processor configured to receive the word text as an input and perform a function for outputting and processing the word text according to user needs.

20. The real-time voice recognition apparatus of claim 19, wherein the output processor displays the word text on a display embedded in the smartphone, stores the word text in a memory unit of the smartphone, and transmits the word text to an external device using a wireless communication function of the smartphone, or the smartphone synthesizes the word text in a voice form and outputs the word text to a voice output device embedded in the smartphone or an external voice output device connected to the smartphone in a wired or wireless manner, and
wherein the lexical/language model processor simultaneously uses a central processing unit (CPU) and a graphics processing unit (GPU) embedded in the smartphone in order to perform the lexical/language model processing function.

\* \* \* \* \*